March 19, 1929. M. B. HAMMOND 1,706,061
BUMPER FOR AUTOMOBILES
Filed March 21, 1928
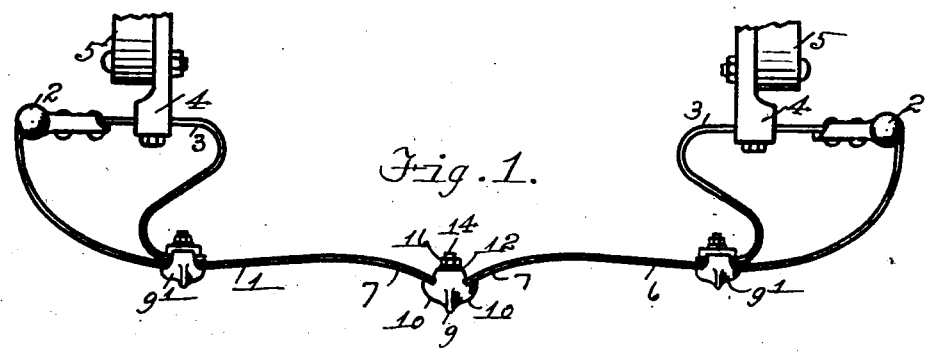
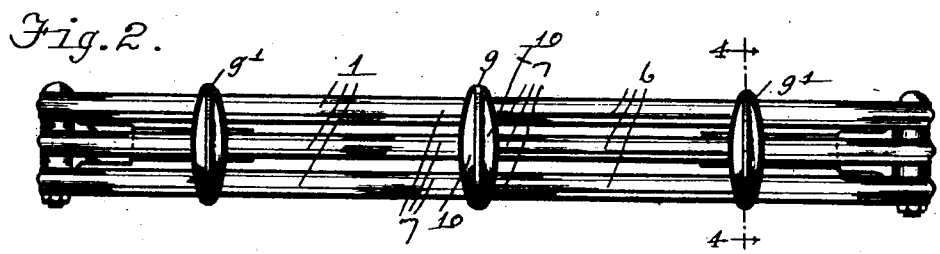
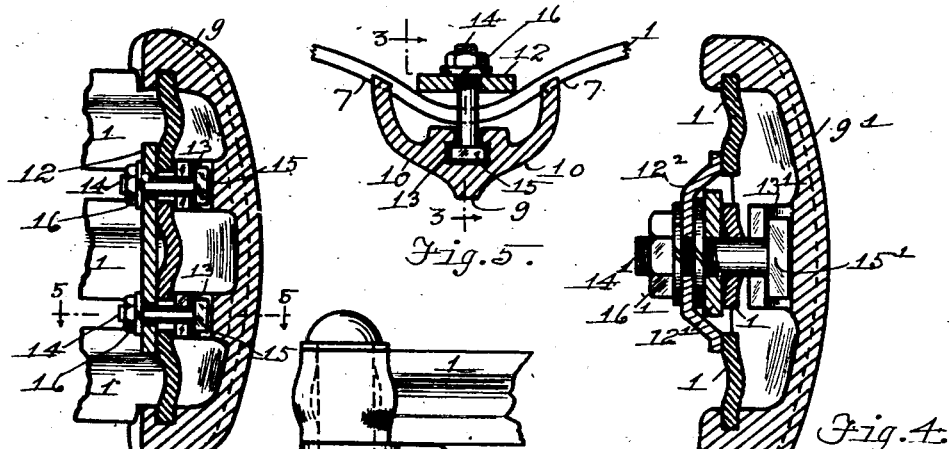
INVENTOR
Milton B. Hammond
BY Cyrus W. Rice
ATTORNEY Patented Mar. 19, 1929.

1,706,061

UNITED STATES PATENT OFFICE.

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

BUMPER FOR AUTOMOBILES.

Application filed March 21, 1928. Serial No. 263,236.

The present invention relates to bumpers for automobiles and the like; and its object is to provide an impact-receiving bumper bar having a middle portion projecting from the main portion of its impact-receiving face and extending in concavely inclined opposite directions toward the ends of the bar, thus providing improved means for deflecting the direct thrust of an impacting body inclinedly toward one or the other of said ends; and further, to provide a forwardly-projecting element mounted on an impact-receiving bar and having opposite sides extending inclinedly toward the ends respectively of the bar, and for the like purpose; a further object being to provide improved means for connecting a plurality of such bars disposed in a vertical plane.

These and any other and more specific objects hereinafter appearing are attained by, and the invention finds preferable embodiment in, the bumper structure hereinafter particularly described in the body of this specification and illustrated by the accompanying drawings, in which:

Figure 1 is a top plan view of a bumper for automobiles;

Figure 2 is a front view thereof;

Figure 3 is a sectional view of the same taken on vertical planes corresponding to line 3—3 of Figure 5;

Figure 4 is a vertical sectional view of certain parts of the structure taken on line 4—4 of Figure 2;

Figure 5 is a horizontal sectional view of certain parts of the structure taken on line 5—5 of Figure 3; and Figure 6 is a rear view of an end of the bumper bars with connected parts.

In the embodiment of the invention illustrated by these drawings, a bumper for vehicles is shown having a plurality (three in this construction) of impact-receiving, preferably resilient, bars 1 extending horizontally and parallelly and disposed in a vertical plane. The ends of these bars are connected by means of a vertical pintle 2 with a rear bar 3 which is supported by the bracket 4 on the vehicle's frame 5. The front or impact-receiving face 6 of each of the bars 1 curves concavely at 7, 7 toward a point intermediate the ends of the bar, i. e., the middle of the bar, as seen in Figure 5; that is, the front face of the bar at 7, 7 is concave rather than convex or straight.

To create a similar plan shape of the bars 1 and bring about the hereinafter-described effect thereof, (and in fact to create an augmentation of such effect) an element 9 may be mounted on the middles of the bars, projecting outwardly or forwardly from their impact-receiving faces as particularly shown in Figure 5. This element 9 has the opposite sides 10, 10 extending inclinedly to the bar's said face.

The purpose or effect of thus shaping the bar 1 itself or the attached element 9 is to deflect an impacting body from its direct forward thrust adjacent the middle of the bars and cause it to strike the inclined portion 7 of the bar, or, in case the element 9 be provided, to strike the inclined side 10 of said element and slide along said portion 7 or side 10 as the case may be, thus lessening the force of such an impact.

The bars 1 are connected by clamping elements in their middles and adjacent their ends. The middle clamping element comprises a pair of members—the aforementioned part 9 and the member 12 engaging the opposite sides of the bars 1. One of said clamp members—the part 9—has vertically extending slots 13 adapted to receive the shanks of bolts 14 and retain the heads 15 of these bolts. Nuts 16 are threaded on these bolts, and being screwed down on the rear member 12, serve to clamp the members 9 and 12 together with the bars 1 between them.

The other clamping elements (adjacent the ends of said bars) are constructed similarly to the clamping element above described, having forward members $9^1$, provided with slots $13^1$, rear members $12^1$, $12^2$, bolts $14^1$ having heads $15^1$ holdingly received in said slots, and nuts $16^1$ threaded on the bolts for clamping the parts together.

The invention being intended to be pointed out in the claims, is not to be limited to or by details of construction of the particular embodiment thereof illustrated by the drawings or hereinbefore described.

I claim:

1. In a bumper for vehicles: a horizontally extending one-piece bar comprising a middle portion and lateral portion having impact-receiving faces extending in continuously and slightly outwardly-concave form from said middle portion, the impact-receiving face of each of said lateral portions, at any vertical section thereof, being in a vertical plane.

2. In a bumper for vehicles: an impact bar; an element mounted thereon, projecting forwardly from the bar's impact-receiving face and having impact-receiving sides, outwardly-concave portions of which are inclined to the bar's said face.

3. In a bumper for vehicles: an impact bar; an element detachably mounted thereon, projecting forwardly from the bar's impact-receiving face and having impact-receiving sides, outwardly-concave portions of which are inclined to the bar's said face.

4. In a bumper for vehicles: a plurality of impact bars disposed in a vertical plane; a connecting element therefor comprising a pair of members engaging the bars' opposite sides; a threaded bolt extending between said members and carrying a nut to clamp said members together with the bars between them; one of said members having a slot adapted to receive the shank of said bolt and to retain its head; and the forward one of said members having vertical sides extending oppositely-inclinedly to the front face of the bars.

In testimony whereof I have hereunto set my hand at Grand Rapids, Michigan, this 17th day of March, 1928.

MILTON B. HAMMOND.